US009863778B2

(12) United States Patent
Anderson et al.

(10) Patent No.: US 9,863,778 B2
(45) Date of Patent: Jan. 9, 2018

(54) SYSTEMS AND METHODS TO DIRECT FOOT TRAFFIC

(71) Applicant: INTEL CORPORATION, Santa Clara, CA (US)

(72) Inventors: Glen J. Anderson, Beaverton, OR (US); Yosi Govezensky, Nofit (IL); Eli Turiel, Shimshit (IL); Tamara Gaidar, Haifa (IL)

(73) Assignee: INTEL CORPORATION, Santa Clara, CA (US)

(*) Notice: Subject to any disclaimer, the term of this patent is extended or adjusted under 35 U.S.C. 154(b) by 75 days.

(21) Appl. No.: 14/974,959

(22) Filed: Dec. 18, 2015

(65) Prior Publication Data

US 2017/0176202 A1   Jun. 22, 2017

(51) Int. Cl.
| | | |
|---|---|---|
| G08G 1/00 | (2006.01) | |
| G01C 21/34 | (2006.01) | |
| H04W 4/02 | (2009.01) | |
| G01C 21/36 | (2006.01) | |

(52) U.S. Cl.
CPC ..... *G01C 21/3492* (2013.01); *G01C 21/3652* (2013.01); *H04W 4/02* (2013.01)

(58) Field of Classification Search
CPC .... G08G 1/0133; G08G 1/0141; G01C 21/26; G01C 21/34; G01C 21/3484
USPC ......... 701/117, 119, 118, 410, 533; 340/907, 340/936
See application file for complete search history.

(56) References Cited

U.S. PATENT DOCUMENTS

| | | | | |
|---|---|---|---|---|
| 6,256,577 B1* | 7/2001 | Graunke | ............ | G01C 21/3694 |
| | | | | 701/117 |
| 6,731,940 B1* | 5/2004 | Nagendran | ............. | H04L 29/06 |
| | | | | 455/456.1 |
| 2002/0168084 A1 | 11/2002 | Trajkovic et al. | | |
| 2011/0300876 A1* | 12/2011 | Lee | ..................... | G01C 21/3438 |
| | | | | 455/456.1 |
| 2012/0223843 A1 | 9/2012 | Wall et al. | | |
| 2013/0101159 A1 | 4/2013 | Chao et al. | | |
| 2013/0116922 A1 | 5/2013 | Cai et al. | | |
| 2015/0253144 A1 | 9/2015 | Rau et al. | | |
| 2017/0017846 A1* | 1/2017 | Felemban | .......... | G06K 9/00785 |

OTHER PUBLICATIONS

PCT/US2016/059087, International Search Report and Written Opinion, dated Jan. 13, 2017, 13 pages.

* cited by examiner

*Primary Examiner* — Dalena Tran
(74) *Attorney, Agent, or Firm* — Stoel Rives LLP

(57) ABSTRACT

Systems and methods for directing foot traffic are disclosed. Crowd data is gathered from one or more crowd data sources to monitor crowd densities of a geographic area. Locations are received for pedestrian client devices within the geographic area. Augmented reality commands are determined and supplied to the pedestrian client devices to direct movement of users, generally away from more dense zones and toward less dense zones within the geographic area. The augmented reality commands may direct haptic augmented reality output by a pedestrian client device and/or an accessory associated therewith.

25 Claims, 5 Drawing Sheets

SYSTEMS AND METHODS TO DIRECT FOOT TRAFFIC

TECHNICAL FIELD

Embodiments herein relate generally to directing crowds and foot traffic patterns.

BACKGROUND

In crowded cities foot traffic proceeds with little guidance other than what a pedestrian can see in front of himself or herself. Having a person direct foot traffic in the middle of a crowded area, such as a subway exit area, may not be very practical. Giving further visual feedback through signage in these crowded areas has limitations, too. For example, a lot of visual information may already be present in the area, such that people may not be able to see further signage. As another example, other individuals of the crowd surrounding an individual may block vision (e.g., especially for the vision of a shorter individual). Also, people have other distractions like smartphones with directions and messages. Moreover, new digital signage is expensive to install and maintain.

Taking advantage of augmented reality channels and modalities like haptics may help guide people to areas with lighter foot traffic.

BRIEF DESCRIPTION OF THE DRAWINGS

FIG. 3A is at a first point in time and FIG. 3B is at a second point in time.

DETAILED DESCRIPTION OF PREFERRED EMBODIMENTS

In areas of dense population, significant foot traffic may proceed with little or no guidance other than objects (e.g., signs, markers, landscaping, other pedestrians) a pedestrian can see in a path ahead. Shorter pedestrians may be at a particular disadvantage in navigating through densely crowded areas. Moreover, an abundance of signage and information presented to pedestrians may create difficulty for pedestrians to view guidance objects.

The present inventors have recognized that using augmented reality (AR) channels and modalities like haptics could help guide people to areas with lighter foot traffic, if a system was aware of current densities and could communicate information dynamically.

The disclosed embodiments include systems and methods for directing pedestrian movement or foot traffic. For example, a system to direct foot traffic can include a crowd monitor and a crowd manager. The crowd monitoring subsystem can receive input from one or more crowd data sources, such as sensors, social media, third-party monitoring systems, and the like, to monitor crowd densities and/or foot traffic patterns within a crowd within a geographic area. The crowd monitor may detect a crowd density of a more dense zone within the geographic area and a crowd density of a less dense zone within the geographic area. The crowd manager may be in electronic communication with the crowd monitor to receive crowd density input from the crowd monitor. The input provides the crowd densities of the geographic area. The crowd manager may receive a location of each of a plurality of pedestrian client devices within the geographic area. The crowd manager may supply one or more AR commands to one or more pedestrian client devices of the plurality of pedestrian client devices to direct movement of one or more users of the plurality of pedestrian client devices away from the more dense zone and toward the less dense zone.

In certain embodiments, the AR commands direct a haptic AR output, such as a vibrating accessory in a shoe, bracelet, or other clothing or device associated with a pedestrian client device of a user. In other embodiments, the AR commands direct a navigation system of a robot user.

Figure 1:
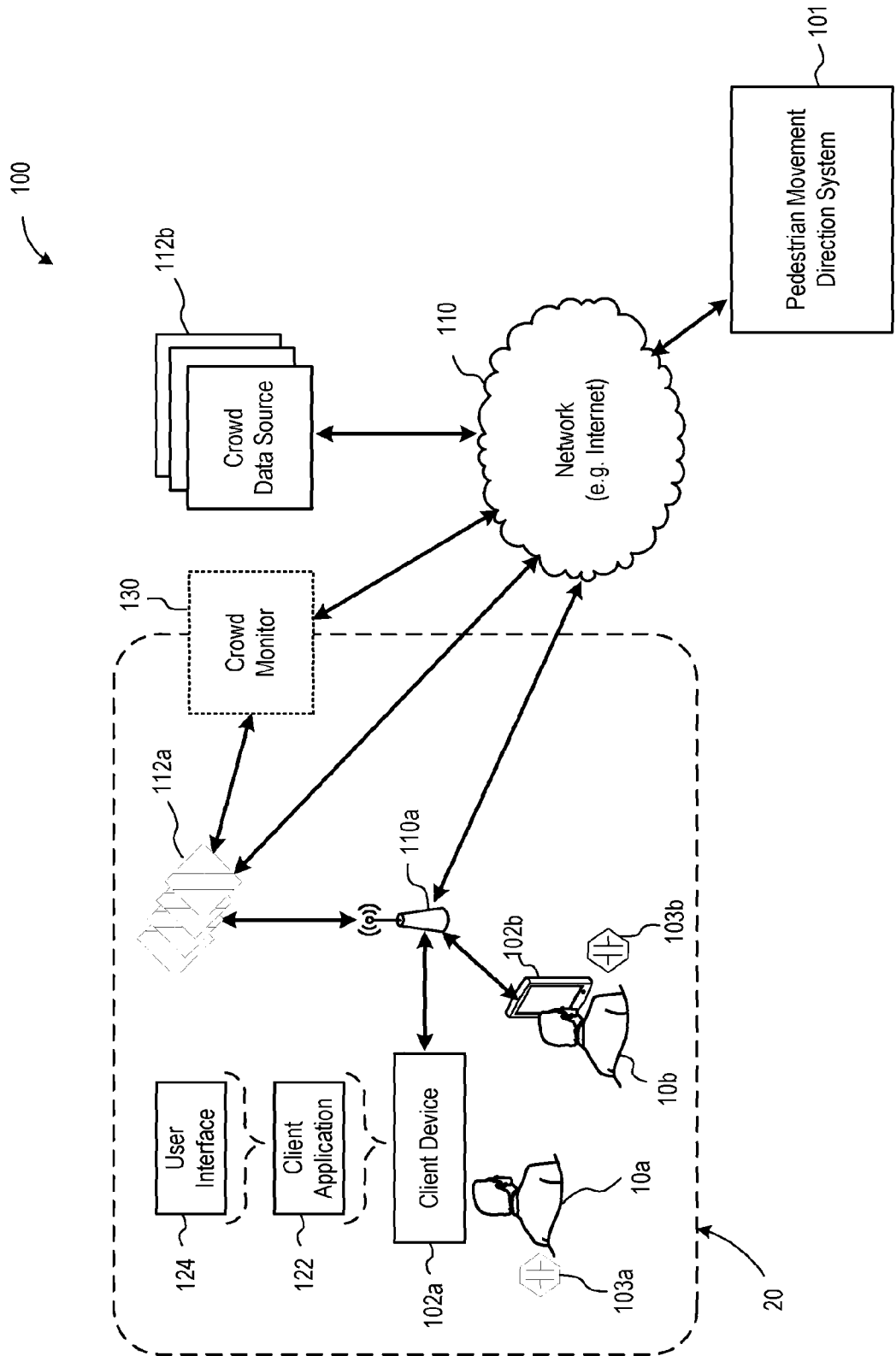
FIG. 1 is a schematic diagram of a system to direct pedestrian movement (or foot traffic), according to one embodiment of the present disclosure.

FIG. 1 is a schematic diagram of a system 100 to direct foot traffic, according to one embodiment. The system 100 provides AR, such as haptics, for directing foot traffic, such as pedestrian movement through or across a crowd. The system 100 provides AR commands to, for example, a plurality of pedestrian client devices 102a, 102b (generally and collectively 102). The AR commands are to direct movement of users 10a, 10b (generally and collectively 10) of the plurality of pedestrian client devices 102 to alter or cause a new foot traffic pattern, for example within a geographic area 20 (or a plurality of geographic areas). The system 100 includes a pedestrian movement direction system 101 coupled to the plurality of pedestrian client devices 102 via an electronic communication network 110 (e.g., the Internet), which may include a wireless network 110a (e.g., WiFi, a wireless telecommunication network). The system 100 also includes one or more sensors 112a and/or other crowd data sources 112b (generally and collectively 112), which may include, but are not limited to, social media systems and third-party crowd monitoring systems. Optionally, or in addition, the system 100 may include a crowd monitor 130 within, adjacent to, or remote from the geographic area 20.

The pedestrian movement direction system 101 receives crowd data electronically from the one or more sensors 112a and/or other crowd data sources 112b. The crowd data enables the system 101 to monitor crowd density. Crowd density may be a concentration of individuals (e.g., pedestrians) within a given geographic area and/or zone within a geographic area. For example, the crowd data may enable the system 100 to detect a higher crowd density of a more dense zone and a lower crowd density of a less dense zone. The system 100 may use crowd data to determine a spatial profile of a geographic area and use the spatial profile to devise improved foot traffic patterns or to otherwise provide AR commands to individual pedestrians.

The pedestrian movement direction system 101 also receives a location of one or more pedestrian client devices 102 within the geographic area 20. The one or more pedestrian client devices 102 may be logged in or otherwise registered with the pedestrian movement direction system 101 and provide location upon entering and/or while within a monitored geographic area 20.

Figure 2:
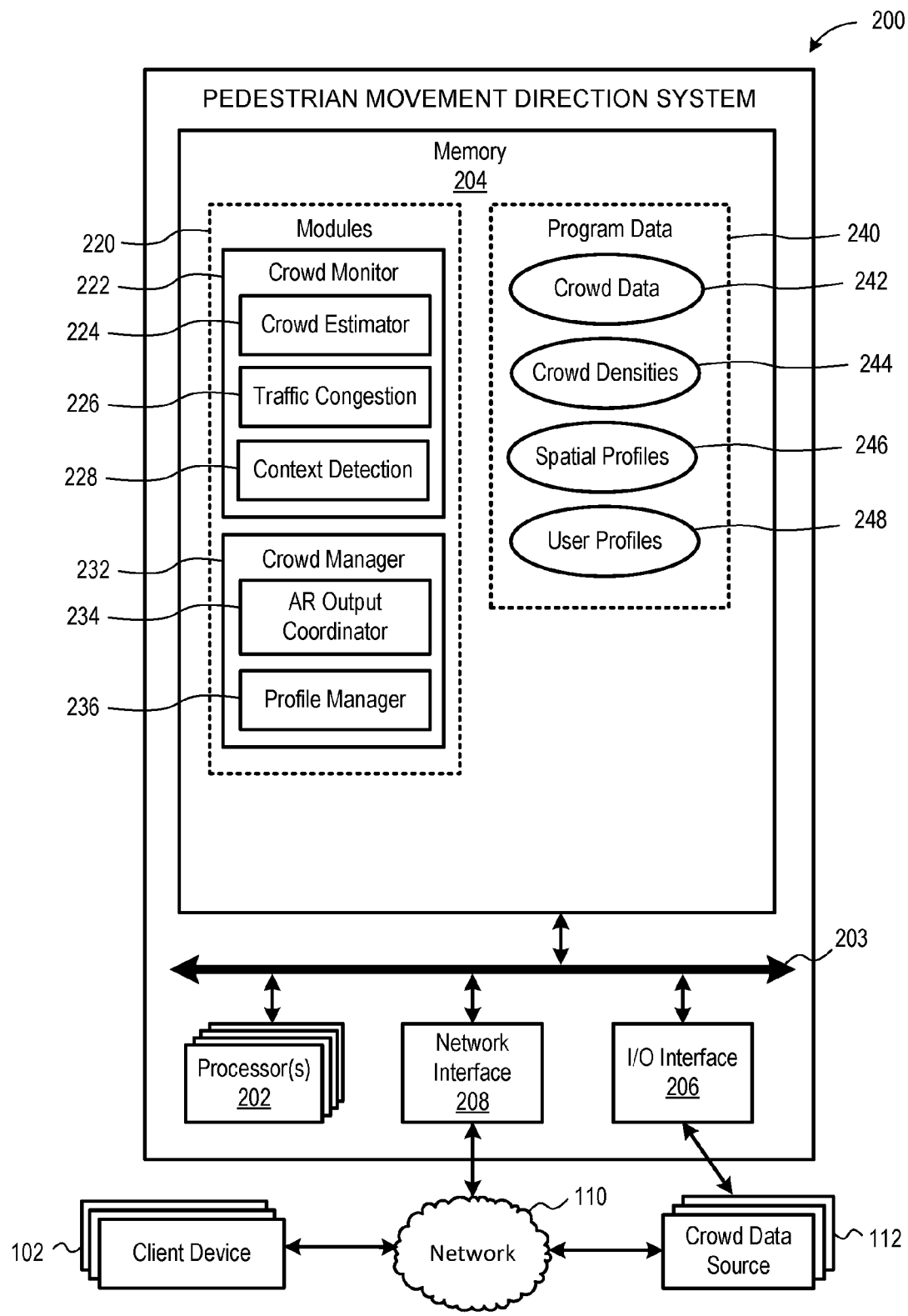
FIG. 2 is a schematic diagram of a system to direct pedestrian movement, according to another embodiment of the present disclosure.

The pedestrian movement direction system 101 supplies one or more AR commands to one or more pedestrian client devices 102 to direct movement of one or more users 10 of the one or more pedestrian client devices 102. The pedestrian movement direction system 101 may determine the AR commands based on the crowd density and the location(s) of the pedestrian client device(s) 102. In certain embodiments, the AR commands are provided to a given pedestrian client device 102 to enable a user 10 of the given pedestrian client device 102 to efficiently navigate through a crowd. For example, the AR commands may direct an AR output that directs the user 10 away from more dense zones and toward less dense zones. In certain other embodiments, the AR commands are provided to a plurality of pedestrian client devices 102. The AR commands may be unique to each of the plurality of pedestrian client devices 102 and/or coordinated to enable the users 10 to efficiently navigate through a crowd. For example, the AR commands may direct AR output at each pedestrian client device 102 that directs the users 10 away from more dense zones and toward less dense zones. In certain embodiments, the AR commands may be coordinated across the plurality of pedestrian client devices 102 to cause a new foot traffic pattern and/or alter a present foot traffic pattern. An example of a pedestrian movement direction system 101 is shown in FIG. 2 and described below with reference to the same.

Each pedestrian client device 102 includes a client application 122, which may provide a user interface 124 for presentation on a display of the pedestrian client device 102. The pedestrian client devices 102 may each be a mobile computing device such as a smartphone or a tablet, or may be any other suitable portable computing device. An AR accessory 103a, 103b (generally and collectively 103) may be included or otherwise associated with each pedestrian client device 102 to process AR commands and provide AR output to users 10 of the pedestrian client device 102. The AR accessories may include, but are not limited to, a head mount display (e.g., glasses), a vibrator within a pedestrian client device 102, a vibrator in a shoe of a user 10, and/or a vibrator or other actuator in a bracelet or other clothing item or accessory of a user 10.

The client application 122 may include an AR coordinator to process AR commands and generate an AR output for a user 10 of the pedestrian client device 102. In certain embodiments, the client application may include an AR coordinator that processes AR commands to generate haptic AR output, such as via an AR accessory 103. In certain embodiments, the user 10 may be a robot and the AR commands direct a navigation system of the robot.

The sensors 112a may include cameras or imagers to capture image data and/or video data of the geographic area 20 and/or zones within the geographic area 20. The sensors 112a may include audio sensors to detect noise levels within the geographic area 20 and/or zones within the geographic area 20. The sensors 112a may include other types of sensors to gather data for detecting crowd density, such as motion sensors, pressure sensors, and sensors that detect odors. The sensors 112a may be positioned at a single location or at multiple locations at, within, and/or proximate to the geographic zone 20 and may collectively gather and communicate crowd data useful for monitoring crowd densities within the geographic area 20.

In certain embodiments, the one or more sensors 112a may be onboard the pedestrian client device(s) 102 and/or users 10 of such. For example, the sensors 112a may include an audio sensor (e.g., a microphone) on the pedestrian client device 102. As another example, the sensors 112a may be disposed on an accessory (e.g., a bracelet, glasses, headphones, headband, head mount display, hat, etc.) of the user(s) 10 of the pedestrian client device(s) 102. The sensors 112a are one example of a crowd data source that provides crowd data to the pedestrian movement direction system 101.

The other crowd data sources 112b may include, but are not limited to, social media systems and third-party crowd monitoring systems. For example, a social media system may include information concerning an upcoming event (e.g., concert, game, performance, conference, exhibition, etc.) at a given location at a given time. Such information may be gleaned to provide crowd data to the pedestrian movement direction system 101. Similarly, third-party websites may provide information on events, circumstances, and the like from which crowd data can be derived and provided to the pedestrian movement direction system 101. News sources may also provide news information from which crowd data can be derived and provided to the pedestrian movement direction system 101. Third-party monitoring systems (e.g., surveillance, security) can also gather information from which crowd data can be derived and provided to the pedestrian movement direction system 101.

The system 100 and/or the pedestrian movement direction system 101 may, based on data received from the crowd data sources 112 (including the sensors 112a), project/plan ahead significant events, for example where many people attend the same event. More specifically, the system 100 and/or the pedestrian movement direction system 101 may plan ahead to identify potential congestion zones or bottlenecks during particularly busy times and avoid directing pedestrians toward those zones. A self-learning module of the pedestrian movement direction system 101 may save a history of events, including any associated projections of such events, and track the scenario, statistics, and determined AR commands for successfully managed events. The history may be referenced in determining AR commands. The history may also be referenced as a crowd data source 112.

The AR accessory 103 (or each of multiple accessories) may be any suitable device to provide AR output to a user 10. The AR accessory 103 may provide haptic AR output, such that the user 10 can feel by touch, or otherwise recognize through interaction involving touch, guidance as to a direction of travel to navigate a crowd. For example, the AR accessory 103 may be one or more haptic vibrators disposed in one or both shoes of the user 10 to provide a vibration that provides a recommended direction of travel (e.g., a vibration on the right indicates a turn to the right is recommended, a vibration on the left indicates a turn to the left is recommended, a vibration in front indicates a forward direction is recommended, and a vibration in back indicates a rearward direction or a 180 degree turn is recommended). As another example, the AR accessory 103 may be a vibrator or actuator disposed, for example, in a bracelet, glasses, headphones, headband, head mount display, hat, etc. of the user(s) 10 of the pedestrian client device(s) 102.

In other embodiments, the AR accessory 103 may provide other types of AR output, such as audio and/or visual AR output. For example, the AR accessory 103 may be a head mount display (e.g., glasses, a visor). The AR accessory 103 may be a speaker disposed on an accessory or in the clothing of the user 10 or disposed on the pedestrian client device 102. In still other embodiments, the AR accessory 103 may be a navigation system of a robotic user.

The client application 122 receives AR commands from the pedestrian movement direction system 101 and coordinates AR output based on the received AR commands. The client application 122 may pair (establish electronic communication) with the AR accessory 103. The client application 122 may also provide the user interface 124 to enable user configuration of settings, such as turning on/off AR output, setting timing and mode of delivery of AR output, indicating route preferences, current destination, and the like. These may be stored in a user profile and the client application 122 may enable user configuration and maintenance of such user profile. The user interface 124 may also provide AR output on a display of the pedestrian client device 102.

The crowd monitor 130 monitors crowd densities and/or traffic of a geographic area 20. In the embodiment of FIG. 1, the crowd monitor 130 is disposed remote from the pedestrian client devices 102, the sensors 112a, the AR accessory 103, and the pedestrian movement direction system 101. In certain other embodiments, the crowd monitor 130 may be disposed local to (e.g., integrated with) one or more of the pedestrian client device(s) 102, the AR accessory 103, the sensors 112a, and/or the pedestrian movement direction system 101. The crowd monitor 130 may be partially or completely disposed within, adjacent to, or remote from the geographic area 20 being monitored. The crowd monitor 130 may receive crowd data from the one or more crowd data sources 112 to determine or otherwise track crowd densities and/or traffic. For example, the crowd monitor 130 may detect a first crowd density, such as of a more dense zone within the geographic area 20, and a second crowd density, such as of a less dense zone within the geographic area 20. The crowd monitor 130 may classify a density or congestion of one or more zones within the geographic area 20, such as classifying the crowd density of the more dense zone and the crowd density of the less dense zone, according to a classification. The crowd monitor 130 communicates the crowd densities and/or classifications of the densities to the pedestrian movement direction system 101 for processing to determine AR commands.

FIG. 2 is a pedestrian movement direction system 200, according to one embodiment. The pedestrian movement direction system 200 may be the same as, similar to, or analogous to the pedestrian movement direction system 101 of FIG. 1. The system 200 may include one or more processors 202, a memory 204, an input/output interface 206, a network interface 208, and a system bus 203.

The one or more processors 202 may include one or more general purpose devices, such as an Intel®, an AMD®, or other standard microprocessor. The one or more processors 202 may include a special purpose processing device, such as an ASIC, an SoC, a SiP, an FPGA, a PAL, a PLA, an FPLA, a PLD, or other customized or programmable device. The one or more processors 202 perform distributed (e.g., parallel) processing to execute or otherwise implement functionalities of the present embodiments. The one or more processors 202 may run a standard operating system and perform standard operating system functions. It is recognized that any standard operating system may be used, such as, for example, Microsoft® Windows®, Apple® MacOS®, Disk Operating System (DOS), UNIX, IRJX, Solaris, SunOS, FreeBSD, Linux®, ffiM® OS/2®, and so forth.

The memory 204 may include static RAM, dynamic RAM, flash memory, one or more flip-flops, ROM, CD-ROM, DVD, disk, tape, or magnetic, optical, or other computer storage media. The memory 204 may include a plurality of program modules 220 and program data 240.

The program modules 220 may include all or portions of other described elements of the system 200. The program modules 220 may run multiple operations, concurrently or in parallel, by or on the one or more processors 202. In some embodiments, portions of the disclosed modules, components, and/or facilities include executable instructions embodied in hardware or firmware, or stored on a non-transitory, machine-readable storage medium. The instructions may comprise computer program code and, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The memory 204 may also include program data 240. Data generated by the system 200, such as by the program modules 220 or other modules, may be stored on the memory 204, for example, as stored program data 240. The stored program data 240 may be organized as one or more databases. In certain embodiments, the program data 240 may be stored in a database system. The database system may reside within the memory 204. In other embodiments, the program data 240 may be remote, such as in a distributed computing and/or storage environment. For example, the program data 240 may be stored in a database system on one or more remote computing devices.

The input/output interface 206 may facilitate interfacing with one or more input devices and/or one or more output devices/systems. The input device(s) may include a keyboard, mouse, touch screen, light pen, tablet, microphone, sensor, or other hardware with accompanying firmware and/or software. The output system(s) may also include a monitor or other display, printer, speech or text synthesizer, switch, signal line, or other hardware with accompanying firmware and/or software.

The network interface 208 may facilitate communication with other computing devices and/or networks 110, such as the Internet and/or other computing and/or communications networks. The network interface 208 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the computing device may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 203 may facilitate communication and/or interaction between the other components of the system 200, including the one or more processors 202, the memory 204, the input/output interface 206, and the network interface 208.

As noted, the system 200 also includes various program modules 220 (or engines, elements, or components) to implement functionalities of the system 200, including a crowd monitor 222 and a crowd manager 232. The crowd monitor 222 may include a crowd estimator 224, a traffic congestion module 226, and/or a context detection module 228. The crowd manager 232 may include an AR output coordinator 234 and/or a profile manager 236. These elements may be embodied, for example, at least partially in the program modules 220. In other embodiments, these elements may be embodied or otherwise implemented in hardware of the system 200.

The system also includes crowd data 242, crowd densities 244, spatial profiles 246, and user profiles 248, all of which may be stored in the program data 240, which may be generated, accessed, and/or manipulated by the program modules 220.

The crowd monitor 222 receives crowd data 242 from one or more crowd data sources 112 to detect and/or monitor crowd densities 244 and/or traffic of a geographic area. In certain embodiments, the crowd data sources 112 may include one or more of sensors, social media, news distributors, etc. The crowd monitor 222 may classify the crowd densities 244 or congestion of one or more zones within the geographic area. The density classification of each of the crowd densities is communicated to the crowd manager with the crowd density. The crowd monitor 222 may use the crowd data 242, the crowd densities 244, and/or the density classification of each of the crowd densities 244 to generate a spatial profile for the geographic area. In FIG. 2, the crowd monitor 222 is part of the pedestrian movement direction system 200, but in certain other embodiments the crowd monitor 222 may be disposed external to or remote from the pedestrian movement direction system 200. The crowd monitor 222, as noted, may include a crowd estimator 224 and a traffic congestion module 226.

The crowd estimator 224 may, by utilizing the one or more processors 202, process crowd data 242 to measure an approximate number of pedestrians in the geographic area and/or in one or more of zones within the geographic area. The estimated or approximated number of pedestrians may aid in determining a crowd density 244 of the geographic area and/or in one or more of zones within the geographic area. The estimated or approximated number of pedestrians may aid in generating a spatial profile 246 of the geographic area.

The traffic congestion module 226 may, by utilizing the one or more processors 202, process crowd data 242 to identify a traffic pattern present in the geographic area and/or detect a point of congestion along the traffic pattern. The traffic pattern and/or points of congestion may aid in determining a crowd density 244 of the geographic area and/or in one or more of zones within the geographic area. The traffic pattern and/or points of congestion may aid in generating a spatial profile 246 of the geographic area.

The context detection module 228 may, by utilizing the one or more processors 202, process crowd data and other data to detect one or more of user location, user activity, and social context. The context detection module 228 may generally classifies physical proximity events based on input from a sensor array, which may detect one or more of pressure from, presence of, and distance of other pedestrians from a given user 10 of a pedestrian client device 102. The sensor array may include, for example, a camera configuration, one or more pressure sensors (e.g., to provide haptic input/measurements), a microphone, a biological sensor (e.g., to provide biological input/measurements), a gaze sensor (e.g., eye tracker), one or more chemical sensors (e.g., to provide scent input/measurements), a temperature sensor, and so forth. The context detection module 228 may detect and classify physical proximity events based on haptic input from the pressure sensors and/or scent input from the chemical sensors. The context detection module 228 may also include a visual understanding component that conducts object recognition, scene understanding, object relationship detection, text recognition (e.g., "text-in-the-wild") and other visual activities. Additionally, an audio understanding component may conduct language/speech understanding, acoustic scene understanding, audio direction detection and other audio activities. The context detection module 228 may also include a haptic understanding component that generates estimations of causes of touch, pressure, proximity, temperature, and so forth. The context detection module 228 may also include a context resolver, that may generate classifications for physical proximity events. The context resolver can include an emotion component, a social component, a proximity component, a physical contact component, a crowd perception component, a schedule component, and so forth. Thus, the emotion component might associate a detected physical proximity event with a particular emotion (e.g., anxiety, fear) based on, for example, a measurement from the biological sensor that indicates the individual's reaction (e.g., brain computer interaction/BCI) to the physical proximity event. The social component may associate a detected physical proximity event with a particular social setting (e.g., party) based on, for example, video input from the camera configuration and/or audio input from the microphone.

The crowd manager 232 is electronically coupled to the crowd monitor 222. The crowd manager 232 receives, typically from the crowd monitor 222, crowd densities of the geographic area and/or one or more of zones within the geographic area. The crowd manager 232 may also receive a location of each of a plurality of pedestrian client devices 102. The crowd manager 232 may determine and/or supply one or more AR commands to one or more pedestrian client devices 102 to direct movement of one or more users 10 of the pedestrian client devices 102. The AR commands may direct movement of the users 10 away from more dense zones and toward less dense zones. The crowd manager 232 determines AR commands based on the crowd densities. For example, the crowd manager 232 may determine AR commands based on the crowd density of a more dense zone and the crowd density of a less dense zone. The crowd manager 232 may determine AR commands for each given pedestrian client device 102 registered with or otherwise in electronic communication with the pedestrian movement direction system 200 that is within the geographic area, based on the location of the given pedestrian client device 102 within the geographic area. In certain embodiments, the crowd manager 232 may determine AR commands based on locations of all pedestrian client devices 102 registered or otherwise in electronic communication with the pedestrian movement direction system 200.

In certain embodiments, the crowd manager 232 may determine or otherwise generate AR commands for a given pedestrian client device 102 based on, or otherwise take into account, AR commands generated for one or more other pedestrian client devices 102, or all the pedestrian client devices 102 registered with or otherwise in electronic communication with the pedestrian movement direction system 200 and within the geographic area. In this manner, the pedestrian movement direction system 200, and more specifically the crowd manager 232, can generate AR commands that direct movement of users 10 of a plurality of pedestrian client devices 102 to alter or cause a new foot traffic pattern within the geographic area.

In certain embodiments, the crowd manager 232 may determine AR commands based on pedestrian destination input providing a destination goal of a user 10 of the one or more users 10 of the plurality of pedestrian client devices 102. The pedestrian destination input providing the destination goal may be received by a client application on a pedestrian client device 102 and electronically communicated to the pedestrian movement direction system 200 and the crowd manager 232. In certain other embodiments, the crowd manager 232 determines the one or more AR commands based on a desired balance of crowd densities and destination goals of one or more users 10. In certain embodiments, the crowd manager 232 determines the one or more AR commands based on pedestrian preferences of a given user 10. The pedestrian preferences may be stored in a user profile 248.

The AR output coordinator 234 of the crowd manager 232 can, by one or more processors, determine and supply the one or more AR commands to the one or more pedestrian client devices 102. The AR output coordinator 234 may determine the one or more AR commands for a given pedestrian client device 102 based on one or more of the crowd data 242, the crowd densities 244 (e.g., the crowd density of a more dense zone and the crowd density of a less dense zone), the location of the given pedestrian client device 102, the locations of all pedestrian client devices 102 registered or otherwise connected to the system 200 and within the geographic area, and/or one or more AR commands for one or more other pedestrian client devices 102.

In certain embodiments, all or a portion of an AR output coordinator may be disposed on a pedestrian client device 102. The crowd manager 232 determines AR commands that are to be received by the AR coordinator on a given pedestrian client device 102. The AR coordinator on the pedestrian client device 102 can process the AR commands to cause an AR output to be provided to a user 10 of the pedestrian client device 102. For example, the AR commands can direct a visual AR output by a pedestrian client device 102.

Figure 3A:
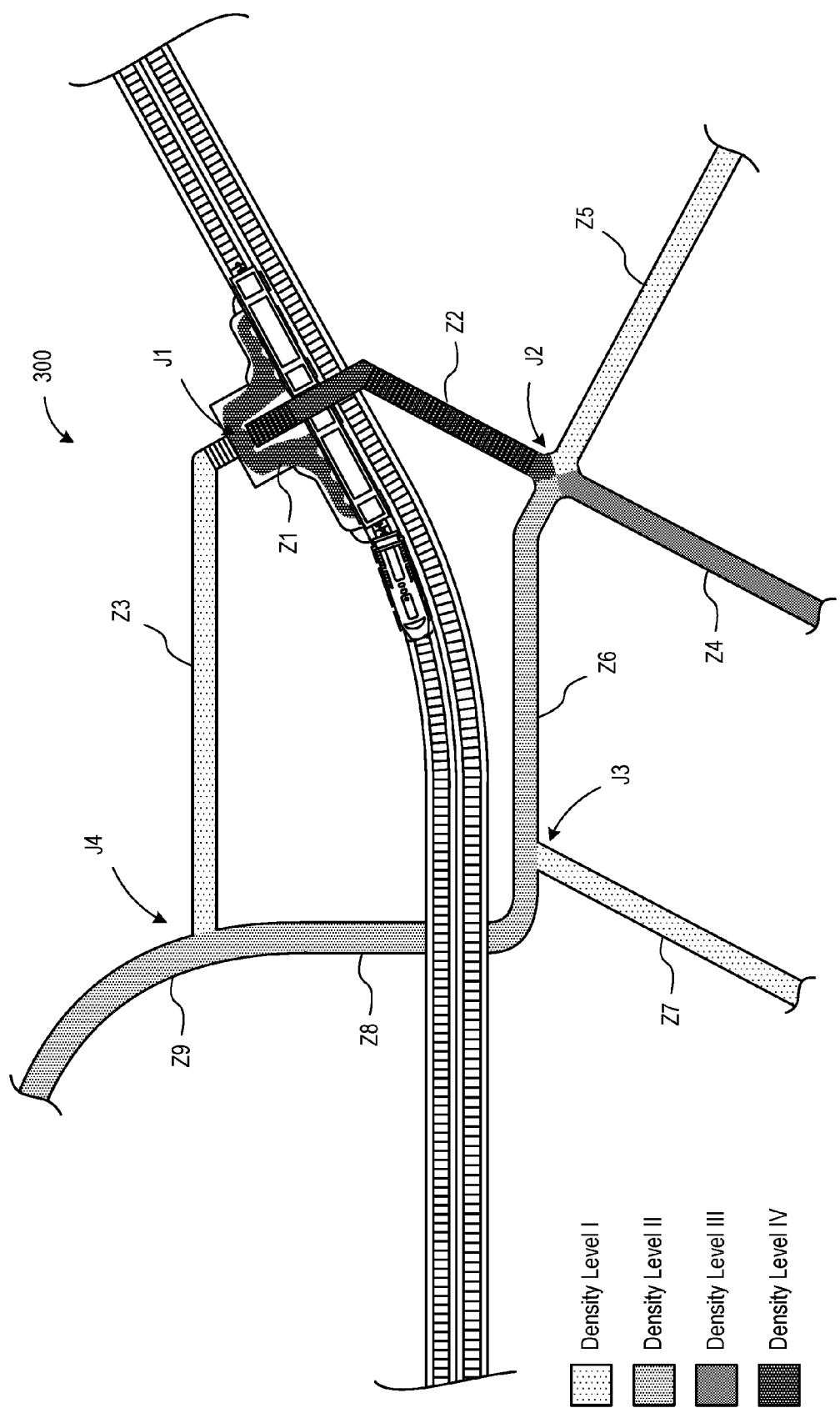
FIGS. 3A and 3B illustrate an example spatial overview of a geographic area in which disclosed systems and methods may be implemented.
Figure 3B:
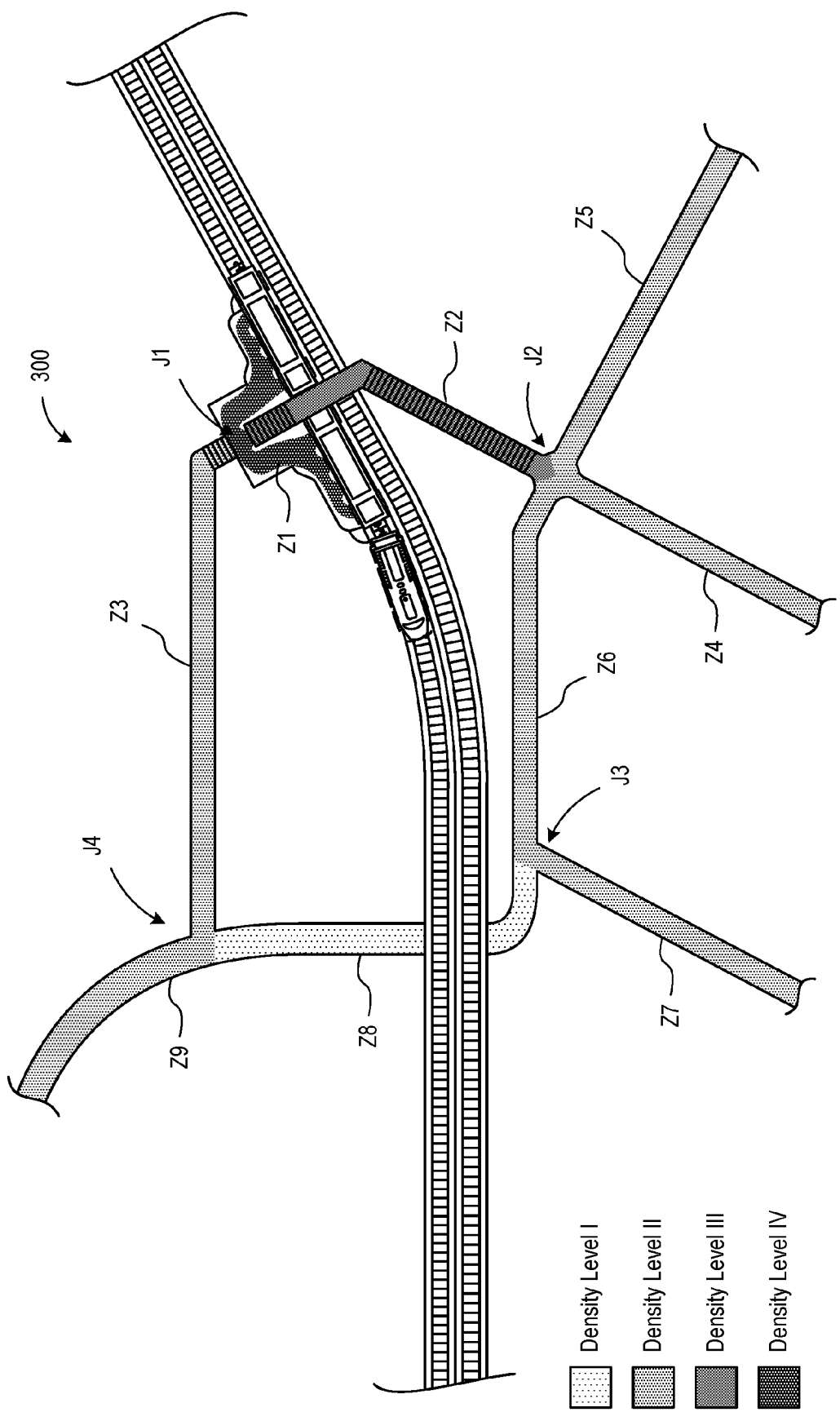

FIGS. 3A and 3B depict an example geographic area 300 in which disclosed systems and methods may be implemented. FIG. 3A is at a first point in time before AR output is provided to pedestrians to direct foot traffic. FIG. 3B is at a second point in time after AR output has been provided to direct foot traffic. The geographic area 300 of FIGS. 3A and 3B is a train station with two exits and multiple paths away from the train station. The geographic area 300 is monitored by or otherwise includes a system to direct pedestrian movement to provide AR commands to users to direct pedestrian movement. The system to direct pedestrian movement may generate a spatial profile based on crowd data to detect a crowd density of each of nine zones Z1, Z2, Z3, Z4, Z5, Z6, Z7, Z8, Z9 of the geographic area 300. Also detected are four junctions J1, J2, J3, J4, which may be included in the spatial profile.

In FIG. 3A, zone Z1 has a density level IV, as passengers file off and on a train. The passenger movement is to and from junction J1 where there is a first entrance from or exit to zone Z2 (e.g., up an escalator) or a second entrance from or exit to zone Z3. As is evident, a majority of train passengers proceed out of zone Z1 into zone Z2 (and/or into zone Z1 from zone Z2) because zone Z2 also has a density level IV. By contrast, zone Z3 is less congested with a density level II.

At junction J2, most pedestrians from zone Z2 continue into zone Z3 (or most pedestrians travel into zone Z2 from zone Z3), which has a density level III. Fewer pedestrians pass into and out of zone Z5, which has a density level I, and zone Z6, which has a density level II.

At junction J3, most pedestrians travel from zone Z6 into zone Z8 (or from zone Z8 into zone Z6) because both zone Z6 and zone Z8 have a density level II. By contrast, zone Z7 has a density level I.

At junction J4, the density level II of zone Z8 and the density level I of zone Z3 results in/from a density level III of zone Z9.

The disclosed systems and methods may detect and monitor the density levels of the nine zones Z1, Z2, Z3, Z4, Z5, Z6, Z7, Z8, Z9 and provides AR commands to pedestrian devices to alter or create new traffic patterns away from more dense zones (e.g., zones with higher density levels III and IV, such as zones Z1, Z2, Z4, Z9) and toward less dense zones (e.g., zones with lower density levels I and II, such as zones Z3, Z5, Z6, Z7, Z8). The disclosed systems and methods may determine AR commands based on the spatial profile of the geographic area 300.

For example, the disclosed systems and methods may provide AR commands to cause AR output to pedestrians at junction J1 to direct movement toward zone Z3, instead of zone Z2. AR commands can be provided to cause AR output to pedestrians at junction J2 to direct movement toward zone Z5, instead of zone Z4 (or zone Z6). AR commands can be provided to cause AR output to pedestrians at junction J3 to direct movement toward zone Z7 instead of zone Z8. As a result of these AR commands, a foot traffic pattern may be altered, or a new foot traffic pattern established.

FIG. 3B illustrates new density levels (and/or a new foot traffic pattern) following AR commands being sent to a plurality of pedestrian client devices to provide AR output to users to direct the users away from more dense zones and toward less dense zones. A greater number of pedestrians were directed at junction J1 to zone Z3, as zone Z2 now has a density level III (instead of a density level IV as in FIG. 3A) and zone Z3 now has a density level II (as compared to a density level I as in FIG. 3A). A greater number of pedestrians were directed at junction J2 to zone Z5, because zone Z4 has a density level II (as compared to a density level III as in FIG. 3A) and zone Z5 has a density level II (as compared to a density level I as in FIG. 3A). A greater number of pedestrians were directed at junction J3 to zone Z7, because zone Z8 now has a density level I (as compared to a density level II as in FIG. 3A) and zone Z7 now has a density level II (as compared to a density level I as in FIG. 3A).

Figure 4:
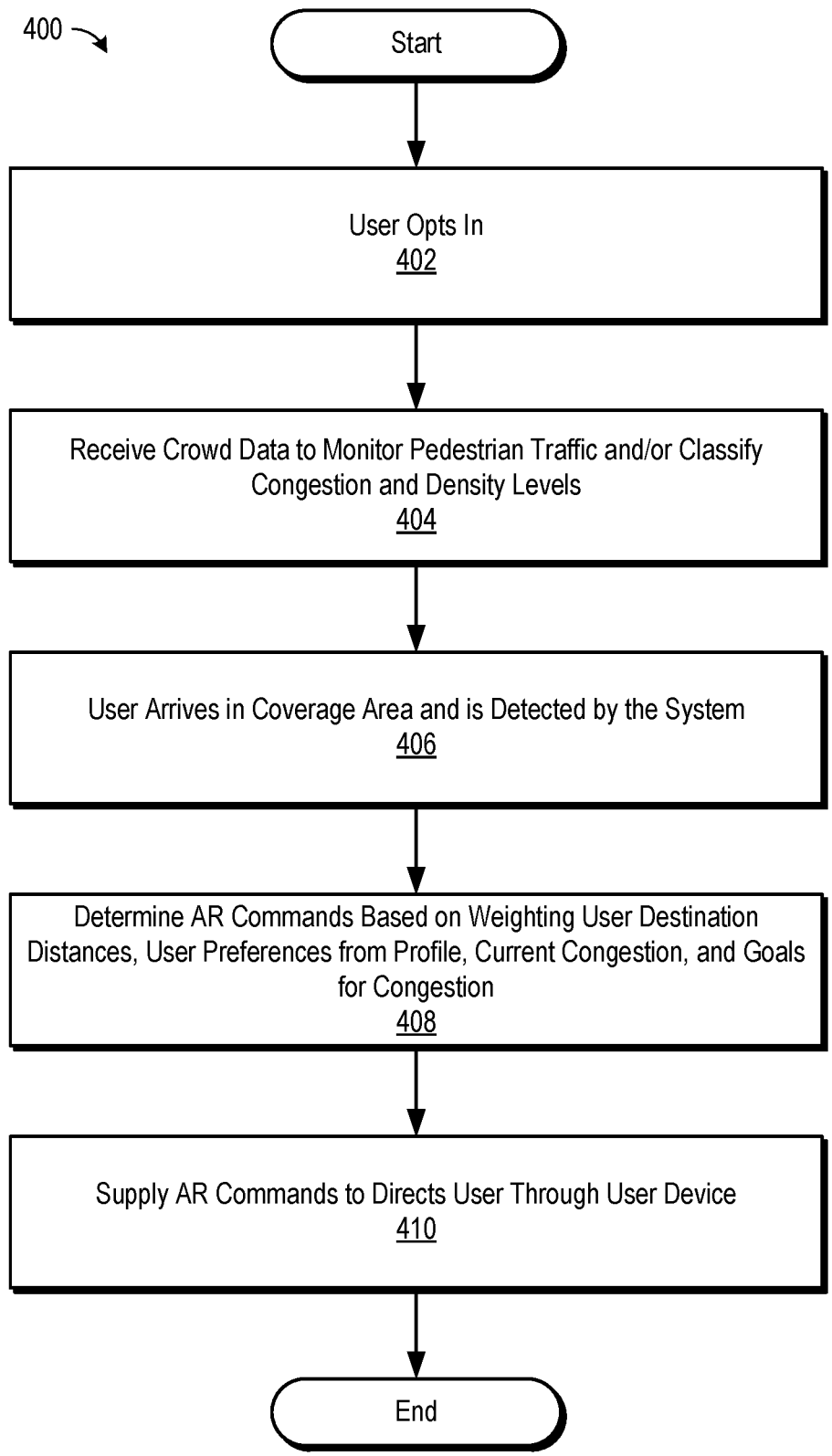
FIG. 4 is a flow diagram of a method to direct pedestrian movement (or foot traffic), according to one embodiment of the present disclosure.

FIG. 4 is a flow diagram of a method 400 to direct pedestrian movement (or foot traffic), according to one embodiment of the present disclosure. A user opts in 402 to receiving AR output to guide movement, such as movement through a crowd. Crowd data is received 404 from one or more crowd data sources, including one or more sensors, to monitor pedestrian traffic and/or classify congestion and density levels of a geographic area, including detecting a crowd density of a more dense zone within the geographic area and a crowd density of a less dense zone within the geographic area.

A user arrives in a coverage area and a location of the user is detected and/or received 406. AR commands are determined 408 based on weighting user destination distances, user preferences from a profile, current congestion, and goals for congestion. One or more AR commands are supplied 410 to one or more pedestrian client devices of the plurality of pedestrian client devices to direct movement of one or more users of the plurality of pedestrian client devices away from the more dense zone and toward the less dense zone.

EXAMPLE EMBODIMENTS

Some examples of embodiments of systems and methods to direct foot traffic are provided below.

Example 1

A system to direct foot traffic comprising: a crowd monitor to receive crowd data from one or more sensors to monitor crowd densities and/or traffic of a geographic area, including detecting a crowd density (e.g., a first crowd density) of a more dense zone within the geographic area and a crowd density (e.g., a second crowd density) of a less dense zone within the geographic area; a crowd manager electronically coupled to the crowd monitor, the crowd manager to receive from the crowd monitor crowd densities of the geographic area, receive a location of each of a plurality of pedestrian client devices within the geographic area, and supply one or more augmented reality (AR) commands to one or more pedestrian client devices of the plurality of pedestrian client devices to direct movement of one or more users of the plurality of pedestrian client devices away from the more dense zone and toward the less dense zone.

Example 2

The system of Example 1, wherein the crowd manager determines the one or more AR commands based on the crowd densities, including the crowd density of the more dense zone and the crowd density of the less dense zone.

Example 3

The system of Example 2, wherein the crowd manager determines the one or more AR commands for each given pedestrian client device of the one or more pedestrian client devices based on the location of the given pedestrian client device.

Example 4

The system of Example 3, wherein the crowd manager determines the one or more AR commands for each given pedestrian client device based on the locations of all the one or more pedestrian client devices.

Example 5

The system of Example 3, wherein the crowd manager determines the one or more AR commands for each given pedestrian client device based on the one or more AR commands for all the one or more pedestrian client devices.

Example 6

The system of any of Examples 1-5, wherein the AR commands direct movement of users of the plurality of pedestrian client devices to alter a foot traffic pattern within the geographic area.

Example 7

The system of any of Examples 1-6, wherein the AR commands direct movement of users of the plurality of pedestrian client devices to cause a new foot traffic pattern within the geographic area.

Example 8

The system of any of Examples 1-7, wherein the AR commands are to be received by an AR coordinator on the one or more pedestrian client devices.

Example 9

The system of any of Examples 1-8, wherein the AR commands direct a visual AR output by a given pedestrian client device.

Example 10

The system of Example 9, wherein the AR commands direct a visual AR output on a head-mount display associated with the given pedestrian client device.

Example 11

The system of any of Examples 1-10, wherein the AR commands direct an audio AR output by a given pedestrian client device.

Example 12

The system of any of Examples 1-11, wherein the AR commands direct a haptic AR output by a given pedestrian client device.

Example 13

The system of any of Examples 1-12, wherein the AR commands direct a haptic AR output by a vibrator within the given pedestrian client device.

Example 14

The system of any of Examples 1-13, wherein the AR commands direct a haptic AR output by an accessory associated with the given pedestrian client device.

Example 15

The system of Example 14, wherein the accessory comprises a shoe insole with a vibrator.

Example 16

The system of Example 14, wherein the accessory comprises a vibrating bracelet.

Example 17

The system of Example 14, wherein the accessory comprises an actuator in a garment of the user.

Example 18

The system of any of Examples 1-17, further comprising the one or more sensors to monitor the crowd densities.

Example 19

The system of Example 18, wherein the one or more sensors comprise cameras to capture image data of the geographic area.

Example 20

The system of Example 18, wherein the one or more sensors comprise audio sensors to detect an amount of noise within the geographic area.

Example 21

The system of any of Examples 1-20, wherein the crowd monitor classifies crowd density or congestion of one or more zones within the geographic area, including classifying the crowd density of the more dense zone and the crowd density of the less dense zone, according to a classification, wherein a density classification of each of the crowd densities is received by the crowd manager with the crowd density input.

Example 22

The system of any of Examples 1-21, wherein the crowd monitor comprises a crowd estimator to, by one or more processors, measure an approximate number of pedestrians in one or more of the more dense zone and the less dense zone.

Example 23

The system of any of Examples 1-22, wherein the crowd monitor comprises a traffic congestion module to, by one or more processors, identify a traffic pattern present in the geographic area and to detect a point of congestion along the traffic pattern.

Example 24

The system of any of Examples 1-23, wherein the crowd manager determines the one or more AR commands based on pedestrian destination input providing a destination goal of a user of the one or more users of the plurality of pedestrian client devices.

Example 25

The system of Example 24, wherein the crowd manager determines the one or more AR commands based on a desired balance of crowd densities and destination goals of the one or more users.

Example 26

The system of any of Examples 1-25, wherein the crowd manager determines the one or more AR commands based on pedestrian preferences of a given user, the pedestrian preferences stored in a user profile.

Example 27

The system of any of Examples 1-26, further comprising a profile manager to receive pedestrian preferences for a given user and to generate and maintain the user profile, wherein the crowd manager determines the one or more AR commands based on the pedestrian preferences of the given user that are stored in the user profile.

Example 28

The system of any of Examples 1-27, wherein the crowd manager comprises an AR output coordinator to, by one or more processors, determine and supply the one or more AR commands to the one or more pedestrian client devices, wherein the AR output coordinator determines the one or more AR commands based on the crowd densities, including the crowd density of the more dense zone and the crowd density of the less dense zone.

Example 29

The system of Example 28, wherein the AR output coordinator determines the one or more AR commands for each given pedestrian client device of the one or more pedestrian client devices based on the location of the given pedestrian client device.

Example 30

The system of Example 29, wherein the AR output coordinator determines the one or more AR commands for each given pedestrian client device based on the locations of all the one or more pedestrian client devices.

Example 31

The system of Example 29, wherein the AR output coordinator determines the one or more AR commands for each given pedestrian client device based on the one or more AR commands for all the one or more pedestrian client devices.

Example 32

The system of any of Examples 1-31, wherein the crowd monitor includes context detection module to detect one or more of user location, user activity, social context, and to detect one or more of pressure from, presence, and distance of other people.

Example 33

A method to direct foot traffic comprising: receiving crowd data from one or more crowd data sources, including one or more sensors; monitoring crowd densities of a geographic area, including detecting a crowd density of a more dense zone within the geographic area and a crowd density of a less dense zone within the geographic area; receiving a location of each of a plurality of pedestrian client devices within the geographic area; supplying one or more augmented reality (AR) commands to one or more pedestrian client devices of the plurality of pedestrian client devices to direct movement of one or more users of the plurality of pedestrian client devices away from the more dense zone and toward the less dense zone.

Example 34

The method of Example 33, further comprising determining the one or more AR commands based on the crowd densities, including the crowd density of the more dense zone and the crowd density of the less dense zone.

Example 35

The method of Example 34, wherein the one or more AR commands for each given pedestrian client device of the one or more pedestrian client devices are determined based on the location of the given pedestrian client device.

Example 36

The method of Example 35, wherein the one or more AR commands for each given pedestrian client device are determined based on the locations of all the one or more pedestrian client devices.

Example 37

The method of Example 35, wherein the one or more AR commands for each given pedestrian client device are determined based on the one or more AR commands for all the one or more pedestrian client devices.

Example 38

The method of any of Examples 33-37, wherein the AR commands direct movement of users of the plurality of pedestrian client devices to alter a foot traffic pattern within the geographic area.

Example 39

The method of any of Examples 33-38, wherein the AR commands direct a haptic AR output by a given pedestrian client device.

Example 40

The method of any of Examples 33-39, wherein the AR commands direct a haptic AR output by a vibrator within the given pedestrian client device.

Example 41

The method of Example 40, wherein the AR commands direct a haptic AR output by an accessory associated with the given pedestrian client device.

Example 42

The method of any of Examples 33-41, wherein the one or more AR commands are determined based on pedestrian destination input that indicates a destination goal of a user of the one or more users of the plurality of pedestrian client devices.

Example 43

A computer readable storage medium having stored thereon instruction that, when executed by a computing device, cause the computing device to perform the method of any of Examples 33-42.

Example 44

A computer readable storage medium having stored thereon instruction that, when executed by a computing device, cause the computing device to perform operations to direct foot traffic, the operations comprising: receiving crowd data from one or more crowd data sources, including one or more sensors; monitoring crowd densities of a geographic area, including detecting a crowd density of a more dense zone within the geographic area and a crowd density of a less dense zone within the geographic area; receiving a location of each of a plurality of pedestrian client devices within the geographic area; supplying one or more augmented reality (AR) commands to one or more pedestrian client devices of the plurality of pedestrian client devices to direct movement of one or more users of the plurality of pedestrian client devices away from the more dense zone and toward the less dense zone.

Example 45

A system to direct pedestrian movement within a crowd, the system comprising: a plurality of sensors each to detect crowd density within a geographic area; a crowd monitor to receive crowd data from the plurality of sensors to monitor crowd densities and/or traffic within the geographic area, including one or more higher crowd densities and one or more lower crowd densities; a crowd manager electronically coupled to the crowd monitor, the crowd manager to: receive the crowd densities from the crowd monitor; receive a location of each of a plurality of pedestrian client devices within the geographic area; determine desired pedestrian movement within the geographic area away from the one or more higher crowd densities and toward the one or more lower crowd densities; an augmented reality (AR) output coordinator to supply one or more AR commands to one or more pedestrian client devices of the plurality of pedestrian client devices to direct movement of one or more users of the one or more pedestrian client devices according to the desired pedestrian movement.

Example 46

The system of Example 45, wherein the AR output coordinator determines the one or more AR commands based on the crowd densities, including the crowd density of the more dense zone and the crowd density of the less dense zone.

Example 47

The system of Example 46, wherein the AR output coordinator determines the one or more AR commands for each given pedestrian client device of the one or more pedestrian client devices based on the location of the given pedestrian client device.

Example 48

The system of Example 47, wherein the AR output coordinator determines the one or more AR commands for each given pedestrian client device based on the locations of all the one or more pedestrian client devices.

Example 49

The system of Example 47, wherein the AR output coordinator determines the one or more AR commands for each given pedestrian client device based on the one or more AR commands for all the one or more pedestrian client devices.

Example 50

The system of any of Examples 45-49, wherein the AR commands direct movement of users of the plurality of pedestrian client devices to cause a new foot traffic pattern within the geographic area.

Example 51

The system of any of Examples 45-50, further comprising a haptic AR accessory to receive the AR commands from the AR output coordinator and provide an AR output to a user.

Example 52

The system of any of Examples 45-51, wherein the AR commands direct a haptic AR output by a given pedestrian client device.

Example 53

The system of any of Examples 45-52, wherein the AR commands direct a haptic AR output by a vibrator within the given pedestrian client device.

Example 54

The system of any of Examples 45-53, wherein the AR commands direct a haptic AR output by an accessory associated with the given pedestrian client device.

Example 55

The system of any of Examples 45-54, wherein the one or more AR commands are determined based on pedestrian destination input that indicates a destination goal of a user of the one or more users of the plurality of pedestrian client devices.

Example 56

A system to provide haptic augmented reality to direct foot traffic, the system comprising: a crowd monitor to receive electronic data from one or more sensors to monitor crowd density, including detecting a higher crowd density of a more dense zone and a lower crowd density of a less dense zone; a crowd manager electronically coupled to the crowd monitor, the crowd manager to track a location of a pedestrian client device and determine a desired pedestrian movement of a user of the pedestrian client device based on a location of the more dense zone and a location of the less dense zone; a haptic augmented reality (AR) output coordinator to supply one or more haptic AR commands to the pedestrian client device to direct movement of the user of the pedestrian client device according to the desired pedestrian movement.

Example 57

The system of Example 56, wherein the one or more haptic AR commands direct movement of the user away from the more dense zone and toward the less dense zone.

Example 58

The system of any of Examples 56-57, further comprising a haptic AR accessory to receive the haptic AR commands from the AR output coordinator and provide an AR output to a user.

Example 59

The system of any of Examples 56-58, wherein the haptic AR commands direct a haptic AR output by a given pedestrian client device.

Example 60

The system of any of Examples 56-59, wherein the haptic AR commands direct a haptic AR output by a vibrator within the given pedestrian client device.

Example 61

The system of any of Examples 56-60, wherein the haptic AR commands direct a haptic AR output by an accessory associated with the given pedestrian client device.

Example 62

The system of any of Examples 56-61, wherein the crowd manager determines the desired pedestrian movement based on pedestrian destination input that indicates a destination goal of a user of the pedestrian client device.

Example 63

A system to direct foot traffic comprising:
means for receiving crowd data from one or more crowd data sources, including one or more sensors; means for monitoring crowd densities of a geographic area, including detecting a crowd density of a more dense zone within the geographic area and a crowd density of a less dense zone within the geographic area; means for receiving a location of each of a plurality of pedestrian client devices within the geographic area; means for supplying one or more augmented reality (AR) commands to one or more pedestrian client devices of the plurality of pedestrian client devices to direct movement of one or more users of the plurality of pedestrian client devices away from the more dense zone and toward the less dense zone.

The above description provides numerous specific details for a thorough understanding of the embodiments described herein. However, those of skill in the art will recognize that one or more of the specific details may be omitted, or other methods, components, or materials may be used. In some cases, well-known features, structures, or operations are not shown or described in detail.

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, a program, an object, a component, a data structure, etc. that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be obvious to those having skill in the art that many changes may be made to the details of the above-described embodiments without departing from the underlying principles of the invention. The scope of the present invention should, therefore, be determined only by the following claims.

What is claimed is:

1. A system to direct foot traffic comprising:
a crowd monitor to receive crowd data from one or more sensors to monitor crowd densities of a geographic area, including detecting a crowd density of a more dense zone within the geographic area and a crowd density of a less dense zone within the geographic area;
a context detection module to detect social context associated with the crowd densities of the geographic area;
a crowd manager electronically coupled to the crowd monitor, the crowd manager to:
receive from the crowd monitor crowd densities of the geographic area,
receive from the context detection module the social context associated with the crowd densities;
receive a location of each of a plurality of pedestrian client devices within the geographic area; and
supply one or more augmented reality (AR) commands based at least in part on the social context to one or more pedestrian client devices of the plurality of pedestrian client devices to direct movement of one or more users of the plurality of pedestrian client devices away from the more dense zone and toward the less dense zone.

2. The system of claim 1, wherein the crowd manager determines the one or more AR commands based on the crowd densities, including the crowd density of the more dense zone and the crowd density of the less dense zone.

3. The system of claim 1, wherein the AR commands direct movement of users of the plurality of pedestrian client devices to alter a foot traffic pattern within the geographic area.

4. The system of claim 1, wherein the AR commands are to be received by an AR coordinator on the one or more pedestrian client devices.

5. The system of claim 1, wherein the AR commands direct a haptic AR output by one or more pedestrian client devices of the plurality of pedestrian client devices.

6. The system of claim 1, wherein the AR commands direct a haptic AR output by a vibrator associated with one or more pedestrian client devices of the plurality of pedestrian client devices.

7. The system of claim 1, wherein the AR commands direct a haptic AR output by an accessory associated with a given pedestrian client device.

8. The system of claim 7, wherein the accessory comprises one of a shoe insole with a vibrator, a vibrating bracelet, and an actuator in a garment.

9. The system of claim 1, further comprising the one or more sensors to monitor the crowd densities.

10. The system of claim 1, wherein the one or more sensors comprise one or more of a camera to capture image data of the geographic area and an audio sensor to detect an amount of noise within the geographic area.

11. The system of claim 1, further comprising a profile manager to receive pedestrian preferences for a given user and to generate and maintain the user profile,
wherein the crowd manager determines the one or more AR commands based on the pedestrian preferences of the given user that are stored in the user profile.

12. The system of claim 1, wherein the social context detected by the context detection module includes physical proximity events determined based on data from a social media system or based on the crowd data from the one or more sensors including one or more of pressure from, presence, and distance of other people.

13. A method to direct foot traffic comprising:
receiving crowd data from one or more crowd data sources, including one or more sensors;
monitoring crowd densities of a geographic area, including detecting a crowd density of a more dense zone within the geographic area and a crowd density of a less dense zone within the geographic area;
detecting social context associated with the crowd densities of the geographic area;
receiving a location of each of a plurality of pedestrian client devices within the geographic area;
supplying one or more augmented reality (AR) commands based at least in part on the social context to one or more pedestrian client devices of the plurality of pedestrian client devices to direct movement of one or more users of the plurality of pedestrian client devices away from the more dense zone and toward the less dense zone.

14. The method of claim 13, further comprising determining the one or more AR commands based on the crowd densities, including the crowd density of the more dense zone and the crowd density of the less dense zone.

15. The method of claim 14, wherein the one or more AR commands for each given pedestrian client device of the one or more pedestrian client devices are determined based on the location of the given pedestrian client device.

16. The method of claim 13, wherein the AR commands direct movement of users of the plurality of pedestrian client devices to alter a foot traffic pattern within the geographic area.

17. The method of claim 13, wherein the AR commands direct a haptic AR output by a given pedestrian client device.

18. The method of claim 13, wherein the AR commands direct a haptic AR output by a vibrator within the given pedestrian client device.

19. The method of claim 18, wherein the AR commands direct a haptic AR output by an accessory associated with the given pedestrian client device.

20. The method of claim 13, wherein the one or more AR commands are determined based on pedestrian destination input that indicates a destination goal of a user of the one or more users of the plurality of pedestrian client devices.

21. A nontransitory computer readable storage medium having stored thereon instruction that, when executed by a computing device, cause the computing device to:
  receive crowd data from one or more crowd data sources, including one or more sensors;
  monitor crowd densities of a geographic area, including detecting a crowd density of a more dense zone within the geographic area and a crowd density of a less dense zone within the geographic area;
  detect social context associated with the crowd densities of the geographic area;
  receive a location of each of a plurality of pedestrian client devices within the geographic area;
  supply one or more augmented reality (AR) commands based at least in part on the social context to one or more pedestrian client devices of the plurality of pedestrian client devices to direct movement of one or more users of the plurality of pedestrian client devices away from the more dense zone and toward the less dense zone.

22. The computer-readable storage medium of claim 21, further having stored thereon instruction that, when executed by a computing device, cause the computing device to:
  determine the one or more AR commands based on the crowd densities, including the crowd density of the more dense zone and the crowd density of the less dense zone.

23. The computer-readable storage medium of claim 22, wherein the one or more AR commands for each given pedestrian client device of the one or more pedestrian client devices are determined based on the location of the given pedestrian client device.

24. The computer-readable storage medium of claim 21, wherein the AR commands direct movement of users of the plurality of pedestrian client devices to alter a foot traffic pattern within the geographic area.

25. The computer-readable storage medium of claim 21, wherein the AR commands direct a haptic AR output by a given pedestrian client device.

* * * * *